Aug. 27, 1929.   F. C. LIMBOCKER   1,726,398
TOOL CARRIER
Filed April 21, 1928   2 Sheets-Sheet 1

F. C. Limbocker
INVENTOR
BY *Victor J. Evans*
ATTORNEY

WITNESS:

Aug. 27, 1929.  F. C. LIMBOCKER  1,726,398
TOOL CARRIER
Filed April 21, 1928   2 Sheets-Sheet 2
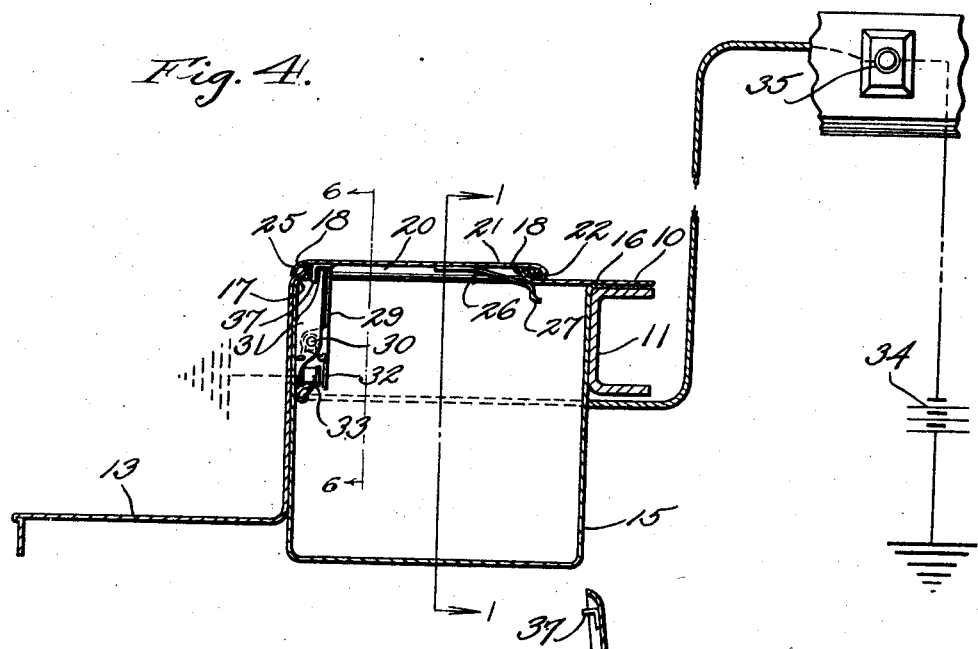
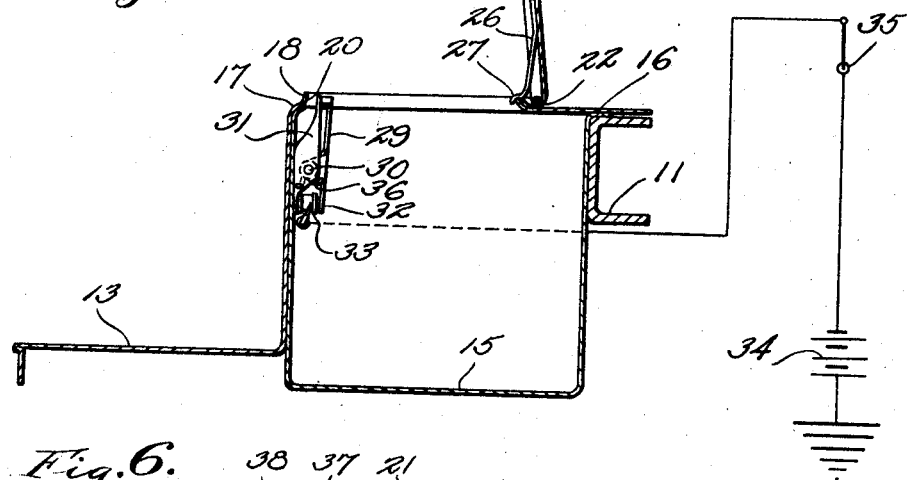
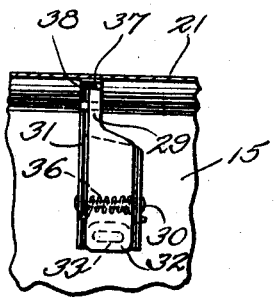
F. C. Limbocker
INVENTOR
BY Victor J. Evans
ATTORNEY Patented Aug. 27, 1929.

1,726,398

UNITED STATES PATENT OFFICE.

FRED C. LIMBOCKER, OF JAFFRAY, BRITISH COLUMBIA, CANADA.

TOOL CARRIER.

Application filed April 21, 1928. Serial No. 271,934.

This invention relates to tool boxes and other compartments adapted to be carried beneath the aprons of motor vehicle bodies.

An object of the invention comprehends a lid for the box or compartment adapted to be carried upon the aprons and from which position the same may be swung to open positions to permit access to the tools without disturbing other occupants of the vehicle.

Another object of the invention contemplates a brace member adapted to sustain the lid in an open position.

An additional object of the invention embodies a latch mechanism wholly disposed within the boxes whereby access thereto will be prevented to unauthorized persons.

A primary object of the latch mechanism embodies means for operating the same from the interior of the vehicle.

With the above and other objects in view, the invention further consists of the following novel features and details of construction, to be hereinafter more fully described, illustrated in the accompanying drawings and pointed out in the appended claim.

In the drawings:

Figure 4 is a sectional view taken on line 4—4 of Figure 1.

Figure 5 is a view similar to Figure 4 with the lid sustained in an open position.

Figure 6 is a sectional view taken on line 6—6 of Figure 4.

Figure 1:
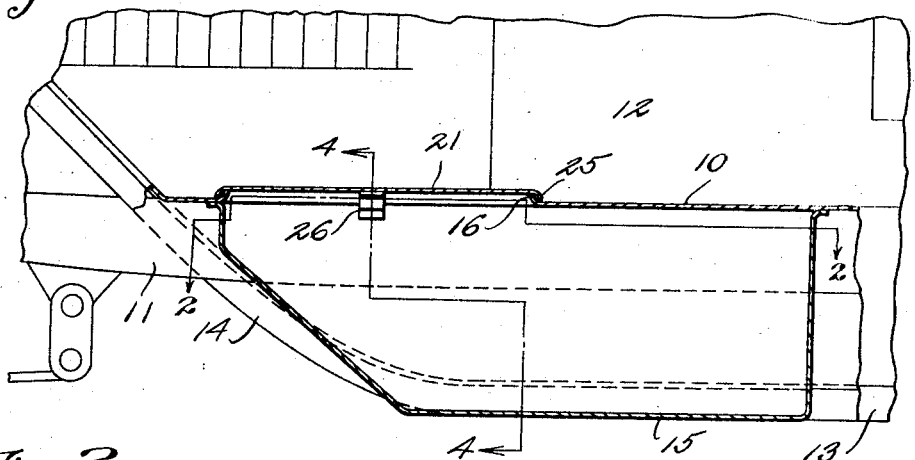
Figure 1 is a sectional view taken on line 1—1 of Figure 4.
Figure 2:
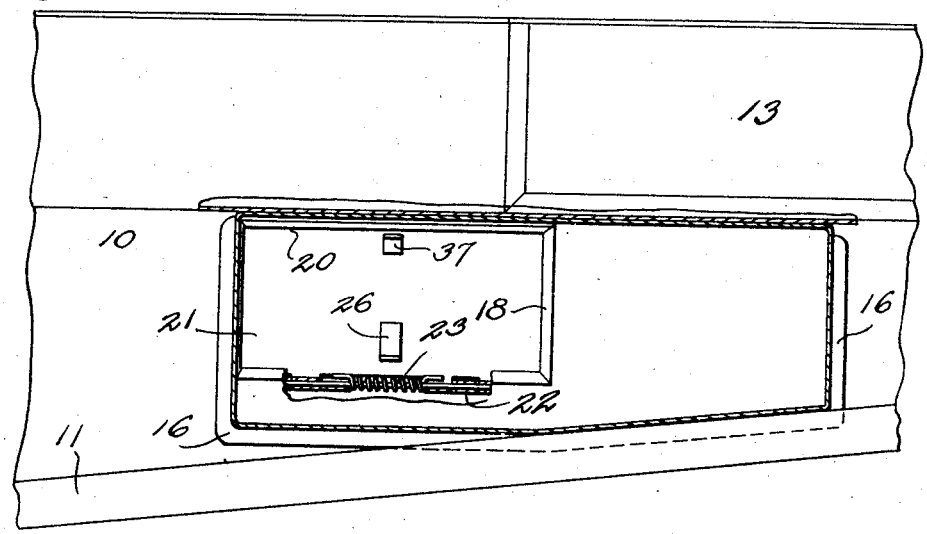
Figure 2 is a longitudinal sectional view taken on line 2—2 of Figure 1.
Figure 3:
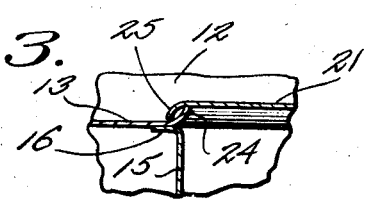
Figure 3 is a detail sectional view taken through the box, apron and lid and illustrating the relationship of Figure 1.

Referring to the drawings in detail, wherein like characters of reference denote corresponding parts, the reference character 10 indicates a portion of an apron extended over the upper side of the chassis 11 of a motor vehicle, such as indicated at 12. A running board 13 is extended outwardly from the apron and which in conjunction with said apron is adapted for connection at the forward ends thereof with a front fender or mud guard 14.

As mentioned in the foregoing, my cardinal purpose is to provide a compartment or box which may be conveniently located immediately beneath the aprons and which may be utilized for holding tools, accessories and equipment in order that the driver may readily have access thereto without disturbing other occupants of the vehicle, as in the instance of having tools or other equipments located beneath the seats.

The box or compartment, as indicated at 15, is provided with an outstanding flange portion 16 upon the innermost side edge thereof adapted for connection with the underside of the apron 10 through the medium of any suitable means for causing union. The forward side edge of the apron is extended inwardly, as indicated at 17, and the apron upturned as indicated at 18. The portions 16 and 18 are located upon the opposite sides of an opening 20 in the apron. Said opening being closed by a lid 21 hingedly mounted, as indicated at 22, upon the upper side of the apron 10. The hinge mounting is further provided with a spring member 23 adapted for use in conjunction with the apron and lid 21 to normally hold the lid in an upright position whereby access may be had to the contents of the box. The flange 18 upstanding from the peripheral edges of the opening 20 in the apron 10 is disposed immediately beneath a peripheral edge 25 rolled or otherwise provided adjacent the edges of the lid or top 21 to prevent ingress of water and other extraneous matter within the box. A brace member 26, carried upon the under side of the top or lid 21, adjacent the hinge connection 22, is provided with an offset extremity 27, adapted for engagement with the uppermost edge of the portion 18. When the lid 21 is swung to occupy the position as illustrated in Figure 5 of the drawings, the brace member 26 will ride over the portion 18. At such juncture the spring finger will flex and engage the offset end of the brace member to sustain the lid in the position shown.

The spring finger when manually depressed will relinquish engagement with the brace member 26 and the lid 21 will then be swung on the hinge 22 to occupy a closed position.

A latch finger 29, pivotally mounted, as indicated at 30, upon a plate member 31, is provided with an enlarged end 32. A solenoid 33, carried within the box 15, is adapted to energize the enlarged end 32 of the latch finger 29 when enclosed in circuit with a motor vehicle source of current 34 through the medium of a switch member 35, the latter being preferably located upon the instrument panel of the vehicle adjacent the steering column. The solenoid being grounded upon the plate member 31. A spring 36, carried by the latch finger 29 is adapted to normally hold the latch finger in the position shown in Figure 4 of the drawings. A latch plate 37, carried upon the underside of the lid or top 21, adjacent the outermost side edge thereof is provided with an opening, not shown, adapted to receive the uppermost and adjacent end of the latch finger 29 when the lid is closed.

It will be noted from the foregoing description and accompanying drawings that in order to open the box, it is necessary to close the circuit between the motor vehicle source of current and solenoid by the switch member 35 which is preferably of the push button type. The lid 21 is automatically shifted to occupy an open position, due to the presence of the spring 23 included in the hinge barrel therefor.

Two or more of such compartments may be provided upon the sides of the vehicles which may be utilized for carrying tools, accessories and etc., and which would be highly appreciated by sportsmen inasmuch as the containers or boxes could effectively carry ice to preserve game, etc.

The invention is susceptible of various changes in its form, proportions and minor details of construction, and the right is herein reserved to make such changes as properly fall within the scope of the appended claim.

Having described the invention, what is claimed is:—

A tool box for use upon the aprons of motor vehicles having openings in communication with the interior of the box, a flange carried by and upstanding from the peripheral edge of the box, a lid for the box hingedly mounted upon the apron and closing said opening, a spring carried at and forming part of the hinge mounting for the lid to normally tension the latter to swing in one direction, a brace member carried by the lid, and the free end of the brace being offset for engagement with the adjacent portion of the flange when said lid is swung to occupy an open position.

In testimony whereof I affix my signature.

FRED C. LIMBOCKER.